United States Patent Office 2,956,932
Patented Oct. 18, 1960

2,956,932

PRODUCTION OF VITAMIN B₁₂ PRODUCTS

Dale Walter Grant, Wasco, Calif., assignor, by mesne assignments, to Olin Mathieson Chemical Corporation, New York, N.Y., a corporation of Virginia No Drawing. Filed Apr. 2, 1957, Ser. No. 650,070

15 Claims. (Cl. 195—114)

My invention relates to the production of substances having high vitamin $B_{12}$ activity by a procedure which includes cultivation of *Propionibacterium freudenreichii* in suitable culture media, particularly wherein molasses as the source of carbohydrate and autolyzed waste brewers' yeast are utilized. The invention deals especially with a method of effecting sharp increases in production of recoverable vitamin $B_{12}$ activity in fermentation broths of the type mentioned.

The preparation of vitamin $B_{12}$ active compounds by fermentations involving the use of *Propionibacterium freudenreichii* has heretofore been proposed (Industrial and Engineering Chemistry, vol. 44, No. 11, November 1952, pp. 2651–2655; and U.S. Patent No. 2,715,602). An important improvement thereon is disclosed in the copending application of Jerry M. Sudarsky and Robert A. Fisher, Serial No. 445,948, filed July 27, 1954, now Patent No. 2,816,856, patented December 17, 1957, wherein, among other advantages, significant increases in yields of vitamin $B_{12}$ compounds are obtained.

In the practice of my present invention, the fermentation is initially carried out by means of a strain of *Propionibacterium freudenreichii* in any suitable manner upon a proper nutrient medium, containing the necessary supplements for nourishing the organism and producing vitamin $B_{12}$ compounds. At the end or at substantially the end of the fermentation step, that is, when the nutrient or culture medium is devoid or essentially devoid of assimilable carbohydrate and further growth of the organism has essentially ceased, the resulting spent fermentation broth is subjected to an oxygenation or aeration treatment. I use the term "spent broth" to mean the sugar-exhausted or essentially sugar-exhausted culture medium containing the total, or at least most of the total, cell population, that is, the non-proliferating resting cells resulting from the propagative stage of the fermentation procedure.

I have discovered that, when the method of my present invention is carried out, the vitamin $B_{12}$ activity of the spent fermentation broths is very greatly increased over that resulting even from the practice of the invention described in the aforementioned Patent No. 2,816,856, the increase usually being of the magnitude of 10% to 25% and, in certain cases, up to 50% or sometimes even more. In general, the lower the vitamin $B_{12}$ activity present in the spent fermentation broth, the greater will be the percentage increase in said activity as a result of the oxygenation or aeration treatment of my invention.

The oxygenation step, which generically includes aeration, is most advantageously and economically effected by means of air, and the air can be bubbled through the spent fermentation broth, preferably while the latter is undergoing mild mechanical agitation, so as to obtain good or substantially maximum contact between the air bubbles and the spent fermentation broth. The oxygenation or aeration is conducted vigorously. A good example of the manner of carrying out the aeration is that which is commonly used in the production of bakers' yeast and the air bubbles may be of a size akin to that used in such yeast production processes. Oxygen gas or oxygen-containing gases, and the utilization of oxygen-releasing chemicals from which the oxygen is released in known ways, such as peroxides, for instances, hydrogen peroxide, sodium peroxide, urea peroxide, sodium percarbonate or the like, can also be used in place of air but, for economic and other reasons, do not constitue the recommended practice. The aeration or oxygenation procedure, here described, results in a rapid rise in pH of the spent fermentation broth and, as pointed out above, in a greatly enhanced content of vitamin $B_{12}$ activity. During the aeration or oxygenation treatment, the pH of the spent fermentation broth is advantageously maintained in the range of about 4 to about 9, especially 6 to 7, by the addition of acid, for instance, sulfuric acid, hydrochloric acid or other acids, and the temperature is advantageously held between 20 and 45 degrees C., especially between 30 and 37 degrees C.

The length of the aeration or oxygenation period is variable but, in any case, in commercial batch operations, will be a substantial number of hours, ordinarily from 20 to 60 hours with 30 to 50 hours being a good average in most situations. In order to reduce the processing time, the aeration or oxygenation of the spent fermentation broth can be carried out during the separation stage wherein the bacterial cells are harvested by centrifugation. Thus, for example, the spent fermentation broth can be aerated or oxygenated in a holding tank as it is fed into the centrifugal separators. The separator cream can be collected in a holding tank until all of the original spent fermentation broth has undergone the first separation stage. Subsequent separation stages can be similarly treated until the desired cell concentration for the final drying stage has been attained.

I have found that the metabolic pattern which favors the development of vitamin $B_{12}$ activity during the aeration or oxygenation treatment in the spent fermentation broth is influenced by the relative proportions of normal metabolic intermediates produced during the earlier stages of fermentation and cell propagation. These proportions are, in general, subject to modification by reason of the variations in raw materials used in the fermentation or nutrient media. I have ascertained, for instance, that, for best results, metabolic acetate should be present and, in most cases at least, the amount thereof normally present in a spent fermentation broth is sufficient to enable the subsequent aeration or oxygenation to achieve good enhancement of vitamin $B_{12}$ activity content. Where, however, there is a deficiency of metabolic acetate in the spent fermentation medium, this can be remedied by the addition of acetate as, for example, by means of sodium acetate.

Over and above the sharp increase in vitamin $B_{12}$ content or activity which is achieved through the practice of my present invention, additional advantages result. The vitamin $B_{12}$ products obtained are characterized by extremely high potency per unit weight because there are few interfering substances, such as inactive vitamin $B_{12}$ variants, and extraction procedures are, therefore, simplified. Another significant advantage of the practice of my invention resides in the fact that the increased vitamin $B_{12}$ activity is achieved with very little increase in production cost. In this connection, it may be pointed out that the physical nature of the bacterial cells is somewhat altered during the aeration or oxygenation treatment as a result of which separation by centrifugation is attained more easily and this tends to bring about a reduction in total processing time. Still another advantage results from the fact that the aeration or oxygenation treatment can be carried out in open tanks under non-sterile conditions and, thus, expensive pressure-type installations are not required.

As has been stated above, the bacterium used in the practice of my invention is *P. freudenreichii* (see Bergey's Manual of Determinative Bacteriology, 6th edition, Williams and Wilkins Co.). The nutrient medium is most advantageously one which consists solely or essentially of molasses, which may be beet molasses, blackstrap molasses, or carrot molasses (derived as a by-product in the treatment of carrots to recover carotene therefrom), and a yeast product. The yeast product may comprise an extract or autolysate of a primary yeast but it is particularly desirable to prepare the extract or autolysate from liquid waste brewers' yeast. In this latter case, at least most of the hop resins should be removed by suitable washing procedures or the like since they interfere with the subsequent fermentation procedure. Of particular utility is an autolysate prepared from washed liquid waste brewers' yeast. The waste liquid brewers' yeast is washed, screened, and autolyzed, for instance, by heating at about 44 degrees C. for about 12 hours, and the autolysate is separated from the residual cells by centrifugation. Various methods known in the art can be used, if desired, to produce the yeast autolysate but the utilization of the above described procedure is preferred. The yeast autolysate may be evaluated by means of an amino nitrogen titration. A value of 0.048% amino nitrogen is equivalent to 1% yeast autolysate solids "Yeastamin" (Vico Products Company). A primary yeast autolysate can be used, and it is also possible to use bakers' yeast or dried primary yeast if enough yeast is added to correspond to an amino nitrogen content in the medium of about 0.048% to about 0.24%. Also, yeast extracts can be used made from about 1% to about 10% yeast, based on the weight of the medium. The especially preferred source of organic supplement is, however, waste brewers' yeast autolysate since this supplies at least most of the organic nitrogen, invertase, growth factors and unknown substances needed simply and at minimum cost.

The sugar content of the molasses used should be converted or inverted and, to this end, the yeast product, such as the autolyzed waste brewers' yeast, should not be subjected to treatments, such as pasteurization at unduly elevated temperatures, which destroy the normal invertase content thereof. In those cases where the yeast product used does not contain invertase or contains insufficient invertase, an extraneous source of invertase can be added. The fermentation is carried out under conditions of gentle agitation, and certain temperature and pH controls, as hereafter pointed out.

The medium needs nothing other than the molasses substrate and the yeast autolysate or the like. While supplemental materials may be added, they are unnecessary to the successful practice of my invention. The autolysate and molasses are admixed, heated to about 45 degrees C. and the pH adjusted to between 5 and 5.5. Enough invertase is present in the yeast autolysate to invert the disaccharides present in the molasses but, as stated above, if this is not the case, extraneous invertase may be added. Inversion is substantially complete in about an hour or so in the usual case. The culture medium advantageously consists of about 2% to about 18% molasses, with about 6% to about 12% constituting a particularly preferred range; and from about 1% to about 5% of yeast autolysate solids, with about 2% to about 3% constituting a particularly preferred range, said percentages being by weight of the culture medium or substrate as a whole. The culture medium, prepared as described above, is sterilized by passing through a continuous sterilizer at about 148 degrees C. for about 12 seconds, cooled to about 28 to 32 degrees C., and charged into a fermenting tank, advantageously sterile fermenting tank, equipped with an agitator to give gentle movement to the liquid. A 5% to 10% inoculum is usually used and the fermentation is carried out at 28 to 32 degrees C., particularly 30 degrees C., with the pH adjusted between about 6.5 and about 7.2 preferably by means of ammonium hydroxide. The fermentation is usually complete in 72 to 96 hours with a resulting vitamin $B_{12}$ yield of 3 to 11 milligrams of vitamin $B_{12}$ activity per liter, depending upon the amount and quality of molasses and yeast autolysate used. The foregoing fermentation details are described in the Sudarsky and Fisher application, supra. The aeration or oxygenation treatment is then carried out, as described above, and thereafter the aerated or oxygenated spent fermentation broth is advantageously passed through yeast type centrifugal separators and the bacterial cells are harvested. The resulting cell cream is diluted with wash water, and the suspension is reseparated. This washing procedure may be carried out as often as necessary depending on the amount of fermentation residue remaining with cells. The cell cream is then dried, advantageously on an atmospheric drum drier using a steam pressure between about 40 and about 100 pounds per square inch. The flakes coming off the drums are ground and screened to the desired particle size.

A typical manner of carrying out the fermentation process proper, utilizing the microorganism *P. freudenreichii*, prior to the practice of the present invention, is as follows:

6000 gallons of fresh liquid waste brewers' yeast containing 12.2% solids were screened through a 100 mesh vibrating screen in order to remove hop resins and other debris. The resulting 5975 gallons of screened yeast were heated to 44 degrees C. and stored, with gentle agitation, for 10 hours to effect autolysis. The resulting autolyzed yeast slurry was subjected to a separation by passing through yeast separators where the residual undissolved yeast matter was removed. The clear yeast autolysate, comprising 4000 gallons containing 6% solids, contained 1992 pounds of yeast autolysate solids. Said autolysate was mixed with 8000 pounds of beet molasses, the volume was adjusted with water to 10,200 gallons and the pH of the mixture was adjusted to 5.1 by the addition of sulfuric acid. Live steam was injected to heat the mixture to 45 degrees C. After 1 hour, during which complete sugar inversion had taken place, the mixture was heated to 80 degrees C. and then passed through a continuous flash sterilizer which held the medium at 143 degrees C. for 12 seconds. After passage through a heat exchanger, the mixture was charged into a 15,000 gallon capacity fermentation tank at 30 degrees C. The pH of said solution or medium was adjusted to 7.0 by the addition of aqua ammonia and the tank was inoculated with 600 gallons of a 48 hour old culture of *P. freudenreichii*. The fermentation was allowed to progress for 96 hours at 30 degrees C. under conditions of gentle agitation, the pH being adjusted by means of periodic additions of aqua ammonia to maintain it between 6.5 and 7.0. An internal pressure of 5 pounds per square inch was held in the tank at all times.

The following examples are illustrative of the practice of my invention but are not to be construed as limitative since certain changes can be made therein in the light of the guiding principles disclosed herein without departing from the spirit of the invention. The vitamin $B_{12}$ activities stated were determined by the U.S.P. microbiological assay for vitamin $B_{12}$.

*Example 1*

A sample of the spent broth from the fermentation conducted as described above was collected at the completion of the propagation period. The said sample, containing the resting cells of *P. freudenreichii*, was adjusted to pH 6.0 with concentrated sulfuric acid and an aliquot was placed in a 1-liter Erlenmeyer flask plugged with cotton (flask 1). Another aliquot of the spent broth was refrigerated for a zero hour aeration control (flask 2).

Flask 1 was placed on a rotary shaker (240 r.p.m., 1¼ inch stroke) in a 30 degrees C. incubator. Aeration was continued for 49 hours. The pH of the aerating spent broth was readjusted to 6.0 with concentrated sulfuric acid after 20 hours and again after 43 hours aeration.

After 49 hours aeration, samples were withdrawn from the flasks for vitamin $B_{12}$ assay. The aerated spent broth (flask 1) contained a total of 850 micrograms of vitamin $B_{12}$ activity. The refrigerated control flask (flask 2) contained a total of 325 micrograms of vitamin $B_{12}$ activity. Thus, the vitamin $B_{12}$ activity of the spent broth was increased 161% by reason of said post-propagation aeration process.

*Example 2*

A sample of spent broth, produced according to a fermentation of the type previously described, was collected from the fermenter at the completion of the propagation period. Said sample, containing the resting cells of *P. freudenreichii*, was adjusted to pH 6.0 with concentrated sulfuric acid and aliquots of said sample were placed in 1-liter Erlenmeyer flasks plugged with cotton. Flask 1 contained only spent broth. Flask 2 contained spent broth to which was added 1% of sodium acetate. Flask 3 was an aliquot of the spent broth placed under refrigeration for a zero hour aeration control. Flasks 1 and 2 were subjected to 48 hours aeration under the conditions described in Example 1 except that the pH of the spent broth was left unadjusted during aeration.

The vitamin $B_{12}$ activity of the three flasks was as follows:

| Flask No.: | Total micrograms of vitamin $B_{12}$ activity |
|---|---|
| 1 | 775 |
| 2 | 1575 |
| 3 | 700 |

*Example 3*

(a) A fermentation medium was prepared containing 4 liters of tap water, said medium including, by weight, 4% glucose, 2% yeast extract, 2% calcium carbonate and 5 parts per million of cobalt in the form of cobaltous chloride. The medium was adjusted to pH 7 with 10 N sodium hydroxide before the addition of the calcium carbonate, placed in a 10 liter bottle, and sterilized at 121 degrees C. for 1 hour. After cooling, the medium was inoculated with 250 ml. of a 6-day culture of *P. freudenreichii* in glucose-yeast extract medium.

Fermentation proceeded for 89 hours at 30 degrees C. at which time the sugar content of the medium was exhausted. The pH of the fermenting medium was maintained in the range of 5.9 to 7.0 by the calcium carbonate in the medium and by the periodic addition of sterile sodium hydroxide. Gentle agitation was provided during the fermentation period by a reciprocal shaker operating at 124 1½ inch strokes per minute. The agitation was, however, not of such character as to change the essential anaerobic character of the fermentation.

(b) An aliquot of the spent broth from part (a) hereof, which, as stated above, contained the resting cells of *P. freudenreichii*, was subjected to aeration for 23½ hours under the conditions described in part (b) of Example 1. The pH of flask 1 was adjusted to 6.0 with concentrated sulfuric acid after 16 hours aeration. Another aliquot of the spent broth (flask 2) was refrigerated for zero hour aeration control.

At the conclusion of the aeration operation, flask 1 contained a total of 1300 micrograms of vitamin $B_{12}$ activity. Flask 2 contained a total of 875 micrograms of vitamin $B_{12}$ activity. In this example, the vitamin $B_{12}$ activity of the spent fermentation broth increased approximately 49% as a result of the post-propagation aeration process.

*Example 4*

Several hundred gallons of a spent fermentation broth, produced in accordance with the procedures described above, containing a total of 34,000 milligrams of vitamin $B_{12}$ activity, and containing the resting cells of *P. freudenreichii*, was adjusted to pH 6.0 with concentrated sulfuric acid and aerated in a tank equipped with air spargers and a mechanical agitator. The spent broth was aerated for 26½ hours during which time the pH was maintained between 6.0 and 7.0 with concentrated sulfuric acid and the temperature maintained between 28 and 32 degrees C. Foaming was controlled with a commercial antifoam agent.

The aerated spent broth contained a total of 53,000 milligrams of vitamin $B_{12}$ activity, representing an increase of about 56% as a result of the post-propagation aeration process.

*Example 5*

The spent broth from a completed fermentation, produced by generally following the procedure described above, containing a total of 123,500 milligrams of vitamin $B_{12}$ activity and containing the resting cells of *P. freudenreichii*, was treated as follows:

A portion of said spent broth was pumped into a tank equipped with air spargers and a mechanical agitator. The aerating tank served also as a reservoir for the separation stage. The conditions of pH and temperature were the same as described in Example 4 hereof. Additional portions of the spent broth were added to the aerating tank as the volume was diminished by the separation process, said separation process comprising the centrifugation of the spent broth by means of yeast-type separators or centrifuges. The resulting separator cream was fed into a collecting tank until all of the spent broth had undergone the initial aeration procedure. Said separator cream was then returned to the aerating tank for further aeration during the second separation in the aforesaid yeast-type separators. A third and fourth separation were effected in a similar manner except that ambient temperature was employed during the fourth separation. The resulting cell cream was dried on a double drum atmospheric dryer at 55 lbs. per square inch gauge steam pressure. The dried powder contained 256,000 milligrams of vitamin $B_{12}$ activity. This represented an increase of about 107% by reason of the post-propagation aeration process.

What I claim as new and desire to protect by Letters Patent of the United States is:

1. In a method of increasing the vitamin $B_{12}$ content of fermentation broths containing the resting cells of *P. freudenreichii* with which a nutrient medium was inoculated and fermentation then effected whereby to develop vitamin $B_{12}$ activity in the cells, the step which comprises vigorously oxygenating said spent fermentation broth for a period of time sufficient to increase the vitamin $B_{12}$ content of said broth over what it was at the end of the fermentation operation.

2. In a method of increasing the vitamin $B_{12}$ content of fermentation broths containing the resting cells of *P. freudenreichii* with which a nutrient medium was inoculated and fermentation then effected whereby to develop vitamin $B_{12}$ activity in the cells, the step which comprises vigorously aerating said spent fermentation broth for a period of time sufficient to increase the vitamin $B_{12}$ content of said broth over what it was at the end of the fermentation operation.

3. In a method of increasing the vitamin $B_{12}$ content of fermentation broths containing the resting cells of *P. freudenreichii* with which a nutrient medium was inoculated and fermentation then effected whereby to develop vitamin $B_{12}$ activity in the cells, the step which comprises vigorously oxygenating said spent fermentation broth while maintaining it at a pH between about 4 and about 9 and at a temperature between about 20 and about 45 degrees C. for a period of time sufficient to increase the vitamin $B_{12}$ content of said broth over what it was at the end of the fermentation operation.

4. In a method of increasing the vitamin $B_{12}$ content of fermentation broths containing the resting cells of P. freudenreichii with which a nutrient medium was inoculated and fermentation then effected whereby to develop vitamin $B_{12}$ activity in the cells, the step which comprises vigorously aerating said spent fermentation broth while maintaining it at a pH between about 6 and about 7 and at a temperature between about 28 and about 32 degrees C. for a period of time sufficient to increase the vitamin $B_{12}$ content of said broth over what it was at the end of the fermentation operation.

5. In a method of producing physiologically active vitamin $B_{12}$ comprising providing an aqueous medium containing as essential ingredients inverted molasses and a yeast product, the molasses comprising from about 2% to about 18%, and the yeast product being present in amount to provide an amino nitrogen content of about 0.048% to about 0.24%, said percentage being by weight of the medium, inoculating said medium with a culture of P. freudenreichii and fermenting for a period of several days to develop vitamin $B_{12}$ activity in the cells, the improvement which comprises increasing the vitamin $B_{12}$ content of the resulting spent fermentation broth containing the resting cells of said P. freudenreichii by vigorously oxygenating said spent fermentation broth while maintaining it at a pH between about 4 and about 9 and at a temperature between about 20 and about 45 degrees C. for a period of time sufficient to increase the vitamin $B_{12}$ content of said broth over what it was at the end of the fermentation operation.

6. In a method of producing physiologically active vitamin $B_{12}$ comprising providing an aqueous medium containing as essential ingredients inverted molasses and yeast autolysate, the molasses comprising from about 8% to about 16%, and the yeast autolysate solids comprising from about 1% to about 5%, said percentages being by weight of the medium, inoculating said medium with a culture of P. freudenreichii, and fermenting for a period of several days under conditions of agitation to develop vitamin $B_{12}$ activity, the improvement which comprises increasing the vitamin $B_{12}$ content of the resulting spent fermentation broth containing the resting cells of said P. freudenreichii by vigorously aerating said spent fermentation broth while maintaining it at a pH between about 4 and about 9 and at a temperature between about 20 and about 45 degrees C. for a period of time sufficient to increase the vitamin $B_{12}$ content of said broth over what it was at the end of the fermentation operation.

7. In a method of producing physiologically active vitamin $B_{12}$ comprising providing an aqueous medium containing as essential ingredients inverted molasses and waste brewers' yeast autolysate, the molasses comprising from about 8% to about 12%, and the yeast autolysate solids comprising from about 2% to about 3%, said percentages being by weight of the medium, inoculating said medium with a culture of P. freudenreichii, and fermenting at a temperature between about 28 and about 32 degrees C. at a pH between about 6.5 and 7.2 for a period of several days under conditions of gentle agitation to develop substantial vitamin $B_{12}$ activity, the improvement which comprises increasing the vitamin $B_{12}$ content of the resulting spent fermentation broth containing the resting cells of said P. freudenreichii by vigorously aerating said spent fermentation broth while maintaining it at a pH between about 6 and about 7 and at a temperature between about 28 and about 32 degrees C. for a period of time sufficient to increase the vitamin $B_{12}$ content of said broth over what it was at the end of the fermentation operation.

8. In a method of producing physiologically active vitamin $B_{12}$ comprising providing an aqueous medium containing as essential ingredients inverted molasses and a yeast product, the molasses comprising from about 2% to about 18%, and the yeast product being present in amount to provide an amino nitrogen content of about 0.048% to about 0.24%, said percentages being by weight of the medium, inoculating said medium with a culture of P. freudenreichii, and fermenting at a temperature of about 30 degrees C. and a pH of about 6.5 to 7.2 for a period of several days under conditions of gentle agitation to develop vitamin $B_{12}$ activity, the improvement which comprises increasing the vitamin $B_{12}$ content of the resulting spent fermentation broth containing the resting cells of said P. freudenreichii by vigorously aerating said spent fermentation broth while maintaining it at a pH between about 6 and about 7 and at a temperature between about 28 to 32 degrees C. for a period of time sufficient to increase the vitamin $B_{12}$ content of said broth over what it was at the end of the fermentation operation.

9. In a method of producing physiologically active vitamin $B_{12}$ comprising providing an aqueous medium containing as essentially its sole ingredients inverted molasses and waste brewers' yeast autolysate, the molasses comprising from about 8% to about 12%, and the yeast autolysate solids comprising from about 2% to about 3%, said percentages being by weight of the medium, inoculating said medium with a culture of P. freudenreichii, and fermenting for a period of several days under conditions of gentle agitation to develop substantial vitamin $B_{12}$ activity, the improvement which comprises increasing the vitamin $B_{12}$ content of the resulting spent fermentation broth containing the resting cells of said P. freudenreichii by vigorously aerating said spent fermentation broth while maintaining it at a pH between about 6 and about 7 and at a temperature between about 28 and about 32 degrees C. for a period of time sufficient to increase the vitamin $B^{12}$ content of said broth over what it was at the end of the fermentation operation.

10. The method of claim 1, which includes the step of effecting the oxygenation in the presence of added acetate ions.

11. The method of claim 4, which includes the step of effecting the aeration in the presence of added acetate ions.

12. The method of claim 7, which includes the steps of effecting the aeration in the presence of added acetate ion.

13. The method of claim 1, wherein the bacterial cells are harvested by centrifugal separation and wherein the oxygenation of the spent fermentation broth is effected during the separation stage.

14. The method of claim 4, wherein the bacterial cells are harvested by centrifugal separation and wherein the aeration of the spent fermentation broth is effected during the separation stage.

15. The method of claim 7, wherein the bacterial cells are harvested by centrifugal separation and wherein the aeration of the spent fermentation broth is effected during the separation stage.

References Cited in the file of this patent

UNITED STATES PATENTS

| 2,643,213 | Hall | June 23, 1953 |
| 2,715,602 | Hargrove | Aug. 16, 1955 |
| 2,764,521 | Leviton | Sept. 25, 1956 |
| 2,796,383 | Robinson | June 18, 1957 |
| 2,816,856 | Sudarsky | Dec. 17, 1957 |
| 2,842,540 | Perlman | July 8, 1958 |

OTHER REFERENCES

Pfeifer et al.; Ind. & Eng. Chem., vol. 46, No. 5, May 1954, pp. 843 to 849 (page 847 especially relied on).